(12) United States Patent
Lim (10) Patent No.: US 7,920,547 B2
(45) Date of Patent: Apr. 5, 2011

(54) VOICE SERVICE SYSTEM AND METHOD OF ACCESSING THE SAME

(75) Inventor: Sang-Pyo Lim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1873 days.

(21) Appl. No.: 11/009,716

(22) Filed: Dec. 13, 2004

(65) Prior Publication Data

US 2005/0157704 A1 Jul. 21, 2005

(30) Foreign Application Priority Data

Jan. 20, 2004 (KR) .................. 10-2004-0004380

(51) Int. Cl.
*H04L 12/66* (2006.01)

(52) U.S. Cl. .................. 370/352; 455/419; 455/442

(58) Field of Classification Search .................. 370/352, 370/395, 395.2; 379/88.17, 207.02, 211.02, 379/67.1, 114.14; 455/442, 419; 709/227
See application file for complete search history.

(56) References Cited

U.S. PATENT DOCUMENTS

| | | | |
|---|---|---|---|
| 6,529,500 B1 | 3/2003 | Pandharipande | |
| 6,539,077 B1 | 3/2003 | Ranalli et al. | |
| 6,747,970 B1 * | 6/2004 | Lamb et al. | 370/352 |
| 6,842,449 B2 * | 1/2005 | Hardjono | 370/352 |
| 6,937,699 B1 * | 8/2005 | Schuster et al. | 379/67.1 |
| 6,963,635 B1 * | 11/2005 | Jones | 379/114.14 |
| 7,123,697 B2 * | 10/2006 | Amir et al. | 379/88.17 |
| 7,139,263 B2 * | 11/2006 | Miller et al. | 370/352 |
| 7,180,889 B1 * | 2/2007 | Kung et al. | 370/352 |
| 7,245,609 B2 * | 7/2007 | D'Eletto | 370/352 |
| 7,304,985 B2 * | 12/2007 | Sojka et al. | 370/352 |
| 7,315,742 B2 * | 1/2008 | Creamer et al. | 455/442 |
| 7,586,898 B1 * | 9/2009 | Koch et al. | 370/352 |
| 7,599,355 B2 * | 10/2009 | Sunstrum | 370/352 |
| 7,664,103 B2 * | 2/2010 | Chu et al. | 370/352 |
| 7,710,945 B2 * | 5/2010 | Jonsson | 370/352 |
| 2002/0069060 A1 | 6/2002 | Cannavo et al. | |
| 2002/0136206 A1 * | 9/2002 | Gallant et al. | 370/352 |
| 2002/0176405 A1 * | 11/2002 | Aijala | 370/352 |
| 2003/0023730 A1 * | 1/2003 | Wengrovitz et al. | 709/227 |
| 2003/0058844 A1 * | 3/2003 | Sojka et al. | 370/352 |
| 2003/0128819 A1 * | 7/2003 | Lee et al. | 379/88.13 |
| 2003/0164986 A1 | 9/2003 | Boire-Lavigne et al. | |
| 2004/0034723 A1 | 2/2004 | Giroti | |
| 2004/0120480 A1 | 6/2004 | Didcock et al. | |
| 2005/0096029 A1 * | 5/2005 | Pelaez et al. | 455/419 |
| 2005/0141688 A1 * | 6/2005 | Wengrovitz | 379/207.02 |
| 2005/0141689 A1 * | 6/2005 | Wengrovitz | 379/207.02 |
| 2005/0141690 A1 * | 6/2005 | Wengrovitz | 379/207.02 |
| 2005/0141691 A1 * | 6/2005 | Wengrovitz | 379/211.02 |
| 2005/0157704 A1 * | 7/2005 | Lim | 370/352 |

* cited by examiner

*Primary Examiner* — Gerald Gauthier
(74) *Attorney, Agent, or Firm* — H.C. Park & Associates, PLC

(57) ABSTRACT

A VoIP-UMS accessed via a private branch exchange or an IP-phone using a Session Initiation Protocol (SIP). More particularly, the method has access the VoIP-UMS in which an initial call setup message is sent which includes call information upon accessing the VoIP-UMS for the purpose of using functions, such as voice mail or the like. When a user accesses a voice service system over a network directly from a terminal, the user accesses via an SIP server, or the user accesses via a switching system, the VoIP-UMS can discriminate connected calls easily, and determinate and respond to the calls rapidly because an INVITE message, which is a Session Initiation Protocol message attempting to access the VoIP-UMS, includes an INFO message that is a message on call information.

25 Claims, 6 Drawing Sheets

VOICE SERVICE SYSTEM AND METHOD OF ACCESSING THE SAME

CLAIM OF PRIORITY

This application makes reference to, incorporates the same herein, and claims all benefits accruing under 35 U.S.C. §119 from an application for THE METHOD FOR VoIP-UMS SYSTEM ACCESS earlier filed in the Korean Intellectual Property Office on 20 Jan. 2004 and there duly assigned Serial No. 2004-4380.

BACKGROUND OF THE INVENTION

1. Field of the Invention

The present invention relates to a voice over Internet protocol-Unified Messaging System (VoIP-UMS) accessed via a private branch exchange or an IP-phone using a Session Initiation Protocol (SIP) and, more particularly, to a VoIP-UMS and method of accessing the same in which an initial call setup message is sent which includes an INFO message representing call information when the VoIP-UMS is accessed for the purpose of using functions, such as voice mail or the like.

2. Description of the Related Art

A Voice over Internet Protocol (VoIP) refers to Internet Protocol (IP) telephone technology for a series of equipment that delivers voice information using IP. Generally, the VoIP is not a traditional protocol based on a circuit like PSTN, Public Switched Telephone Network. The VoIP sends the voice information within discontinuous packets in a digital form.

A primary advantage of the VoIP and Internet telephony technology is that telephone users can get long-distance and international telephone services under Internet and Intranet environments only with local phone charges because an integrated telephone service is implemented by utilizing an existing IP network as it is.

For a voice call through the VoIP, using a public network cannot guarantee the same quality of service (QoS) as that in a circuit network, and thus, a private network, managed by a personal company or an Internet telephone service provider, may be used for a high quality of service.

The Internet telephone service provider is operating a server that manages an IP address corresponding to a called party's telephone number, and allowing a user to make a voice call over the Internet without separately managing the IP address corresponding to the called party's telephone number.

The VoIP may allow a customer to directly talk with a staff or a consultant so long as the customer presses a button on the Internet while navigating the Internet without using a separate telephone. A call center to which the VoIP has been applied is configured into two types of systems. The one is of a private automatic branch exchange (PABX) standalone type having a separate VoIP gateway and the other is of a private automatic branch exchange (PABX) integrated type in which a PABX has a VoIP gateway included therein.

To use the VoIP, a company must have a gateway with a VoIP equipment disposed therein. The gateway receives a delivered voice, which has been segmented into packets, from users in the company, and forwards the packets to other parts on the Intranet or to the PSTN using a T-1 (A dedicated digital connection supporting data rates of 1.544 Mbits per second, 24 channels at 64 Kbps, also called DS 1) or E1 (European format for digital transmission, carrying signals at 2 Mbps, 32 channels at 64 Kbps, with 2 channels reserved for signaling and controlling) interface.

The VoIP uses a real-time transport protocol (RTP) in order to support that packets arrive at on time, in addition to its original IP function. Using the public network can hardly guarantee quality of service (QoS). Using any private network managed by the personal company or the Internet telephone service provider (ITSP) may provide a more excellent service.

A Unified Messaging System (UMS) refers to a system that stores and manages various types of all messages, such as voice, Fax (facsimile), E-mail (electronic-mail), and the like, in one logical post-box. The messages are accessible to PCs (personal computers) as well as a variety of communication media, such as telephones, Faxes, mobile phones, or the like. A user suffices to have only one kind of interface regardless of the types of the message because different types of messages such as voice mails, Faxes, E-mails or the like are allowed to be retrieved, formulated and exchanged in one mail box by unifying wired and wireless telephones and data communication networks.

The UMS is more advanced technology based on existing E-mail/VMS technology. It has been extensively applied to several fields such as call centers, companies, ISP businesses, special category communications, mobile communications, or the like by enabling rapid, exact and smooth communications to be performed between an individual and a company and between a company and a company.

The voice communication technology and the data communication technology have been developed based on different technologies. However, with the advent of VoIP technology which digitalizes data to be handled as text information, discrimination between the voice communication and the data communication becomes ambiguous.

The trend of unifying both voice and data leads to UMS that is a solution that provides effective management on numerous messages regardless of the types of the messages, and provides the bi-directional use.

The development and rapid distribution of the Internet technology are shifting a communication service basis to the Internet. As markets such as companies, communication businesses or the like are changed rapidly, users highly desire to handle several types of incoming information in an integrated manner. A system satisfying this desire is UMS called next generation CTI technology.

A Session Initiation Protocol (SIP) is a standard for VoIP connection setup. The SIP is an application layer control protocol that sets, modifies and terminates a session in a client-server manner and is based on a very simple text.

The SIP is not fixed to any protocol stack but is easy to extend and use because it is based on a text such as HTTP (hypertext transfer protocol). The SIP is composed of a user agent and a network server. The user agent is a termination system and is composed of a user agent client and a user agent server.

The SIP operates in such a transaction processing method that a client sends a service request message to a server, and the server processes it and then sends a response message to the client, like HTTP.

Users that communicate using the SIP will use a Uniform Resource Identifier (URI) of a "user@host-plus-domain" format, similar to an E-mail address, as an identifier between the respective users.

Since the SIP is based on IP, it does not have to consider inter-operability as in H.323. The SIP is simpler than H.323, thereby implementing at a low cost. In addition, an instruction or message format is easily decoded or debugged and extended because it is simple. Security, management extensibility or the like is excellent due to a client-server structure.

The SIP provides two connection methods to a called party, i.e., via a proxy server and directly. A calling party will request a call to a called party by sending an INVITE message using an addressing manner suitable for the SIP.

Addresses used in the SIP can be largely classified into three addresses. First, the combination of a network name and a host name used by a user with an Id (identification) used for the user to login may be used as the SIP address. Second, an IP address itself may be used as the SIP address. Third, an E-mail address or a DNS (domain name system, server, or service) name used in an existing homepage may be used as the SIP address. Using an existing E-mail address is the most realized manner.

Call setup is classified into several methods according to situations.

First, determination is made regarding whether the call setup to a called party is attempted via a proxy server or directly. If a calling party knows a called party's address and is allowed to directly set up a call to the called party, the calling party will set up a call directly. On the other hand, in the case where the call setup is made via the proxy, the calling party will set up a call after discovering the called party's address with reference to a DNS lookup table.

A second method is to discover a called party's address using a request response protocol and to set up a call. A request message will be delivered using a predefined, well known port number through TCP (transmission control protocol) or UDP (user datagram protocol).

If a client user agent receives a message via the above-defined, well known port while the user examines the network, the agent will send a response message to participate in telephone or video conference. If a problem associated with the received message or the transmitted message occurs due to the user agent or the server, the agent sends a message indicating that an ICMP (Internet control message protocol) message is not allowed to arrive, and notifies that the problem occurs.

All SIP messages are based on a text. Upon delivering the messages, several ones of the messages are sent by one TCP segment or UDP datagram using TCP or UDP.

The SIP has been developed in consideration of scalability, extensibility, flexibility, interoperability, and the like. Accordingly, the SIP has advantages that the SIP is more concise than competitive H.323, is easily integrated and inter-worked with an existing Internet/web environment, and is easy to enhance and extend. Using the SIP enables various types of new multimedia communication services on the Internet, such as a VoIP service, to be developed with relatively low cost and less time.

Particularly, the introduction of the SIP can easily solve insufficient interworking between VoIP business networks, incomplete interoperability between VoIP equipment, or the like, which are regarded as the greatest weaknesses in H.323.

Thus, a user is able to use a multimedia communications service throughout the world only with one SIP URI (uniform resource identifier) allocated to the user, thereby providing the maximized convenience and work efficiency to the user.

The advent of the SIP leads to many spreading effects in communication service markets using the Internet. Most of the existing VoIP systems have been implemented based on an H.323 protocol that is adopted as a standard by ITU-T (International Telecommunication Union-Telecommunication standardization sector).

However, since H.323 is a technical scheme that is originally developed to allow for multipoint voice, video, and data communications on a packet-switching LAN network, it basically has limitations in supporting a broadband network and a great number of users.

Internet telephone technologies have been highly spot-lighted as marketable technology because VoIP related markets have become larger. At this time, SIP that is a signaling protocol for bi-point/multi-point communications on Internet becomes paid attention as technology substituting for an existing H.323.

The SIP is simpler than H.323. In SIP, if a caller party sends to a called party an invite message including information on the caller party and session information for exchanging multimedia data, then the called party notifies whether to accept it. SIP has a connection process simpler than that of H.323 while SIP has a disadvantage in that it cannot recognize all capabilities of the terminal. SIP has a regulation on inter-communication between servers while H.323 has no regulation.

Currently, The SIP is being used or developed as a call signaling protocol for application services in several fields. As previously described, SIP is a text based protocol such as HTTP, and employs the same identifier having an address system similar to an E-mail address system so that a voice call service as well as an E-mail service, an instant message service, or the like is provided without regard to when and where.

The SIP supports a capability-based service depending on use capability through a session parameter within a body portion of an SIP message format when a session is established, the SIP message format being composed of a head and a body.

The SIP users can register their own portable phone numbers, office numbers, home telephone numbers, E-mail addresses, or the like in a server. In addition, processing contents or the like for all calls can be stored in the server. Since the SIP is a text-based protocol, the type of message is a request/response format composed of a method and a response to the method.

Meanwhile, to allow the VoIP-UMS to be used with the SIP, message delivery may be performed through a Private Branch eXchange (PBX).

Normally, a private branch exchange or a key phone system (hereinafter, referred to as 'private branch exchange') refers to an in-plant switching equipment disposed in plants such as government and public offices, companies, hospitals, or the like.

The private branch exchange includes an extension subscriber card (SLIC: Subscriber Line Interface Card) accommodating extension subscribers, to which extension telephones are connected, and a trunk card connected to a central office line (COL) that is connected to a central office exchange. At this time, a number of extension subscribers may make calls therebetween without passing through an external central office line, and may make an outgoing call to the external central office line after dialing a trunk access code, such as '9' and then an external telephone number.

Generally, extension lines for extension subscribers, connected to the private branch exchange, include extension lines accommodating typical analog telephones, key phone lines accommodating key phone telephones, ISDN Basic Rate Interface (ISDN BRI) lines accommodating Integrated Services Digital Network (ISDN) telephones, lines accommodating multi-function telephones (e.g., digital telephones), and the like. These lines are each connected to a back board of a matching device mounted on the private branch exchange in a board form.

Further, the central office lines connected to the private branch exchange include an analog trunk, a digital trunk such as an E1 line, a T1 line or the like, an ISDN Primary Rate Interface (ISDN PRI) line, and the like. These lines are connected to the back board of the matching device mounted on the private branch exchange.

Using VoIP in the private branch exchange requires a gateway. This gateway serves to receive voice data, which is segmented into packets and then transmitted, from users and deliver the data to a destination over a network such as Internet, Intranet or the like, or to directly connect a relevant call to PSTN using an analog trunk and a T1 or E1 interface.

Normally, upon using the VoIP gateway connected to the private branch exchange, the private branch exchange separates a central office line connected to the VoIP gateway and offers a different access code to the central office line.

For example, when an extension subscriber desires to make a voice call with an external called party via the VoIP gateway, a trunk access code is allocated to '8' while when the extension subscriber desires to make a call with an external called party via a typical central office line connected to PSTN, a trunk access code is allocated to '9'. Thus, the divided codes are used.

Further, in the case where a desired voice call is made via the VoIP gateway, only an outgoing call is permitted. An incoming call is permitted via the central office line.

To make a VoIP call, first, a user should pick up a telephone receiver, confirm a dial tone from the private branch exchange, and then press a dial number to connect to a VoIP gateway that serves to connect the private branch exchange and TCP/IP network (Internet).

At this time, the VoIP gateway will inquire a routing table to see whether the entered number is a serviceable number.

If the entered number is not the serviceable number, the VoIP gateway confirms whether connection to another VoIP gateway is required. If not required, the gateway returns the relevant information to the private branch exchange to induce a call attempt via a typical telephone network.

If the VoIP gateway discovers an Internet path corresponding to the entered number, it allows a call to be made. For this purpose, the gateway should secure a line to a VoIP gateway of a called party.

The VoIP gateway at a calling party modulates voice into IP packets and then transmits relevant IP packets via a given path over the TCP/IP network as if they are relevant data packets.

The VoIP gateway at a receiving side receiving the IP packet data recombines packet information to restore into an analog signal, route the restored signal in a phone call form via PSTN in the exchange station or another private branch exchange, and directly connects a call to the receiving telephone. Thus, the routing procedure for a voice call via Internet is completed.

Meanwhile, in the earlier art, when a user accesses the UMS, the SIP does not send, on an initial call setup message, information for the currently attempted call, for example, call information such as NoAnswer Forward, Busy Forward or the like, but sends the information using a separate message. Accordingly, the UMS cannot recognize call information until receiving a message containing the call information, which obstructing rapid response. Further, there was a problem that message loss, delay, or the like is caused due to the property of the VoIP network, resulting in difficulty in function and implementation.

SUMMARY OF THE INVENTION

It is, therefore, an object of the present invention to provide a system and method in which effective VoIP-UMS utilization is allowed by including call information in an SIP message attempting to access VoIP-UMS.

It is another object of the present invention to provide an accessing of the UMS with the invite message containing the access message information, accommodating the UMS to easily discriminate calls connected by a display name of a FROM header making up the invite message, thereby providing a proper voice service.

It is yet another object of the present invention to provide a voice service system and a private branch exchange including an SIP module to allow an SIP to be performed, and through the private branch exchange supporting an SIP message, where a user can set his or her phone to BUSY or ALL FORWARD so that an incoming call when the user is busy or all incoming calls are connected with the UMS.

It is another object of the present invention to provide for, when a user accesses a voice service system over a network directly from a terminal, a user accessing via an SIP server, or a user accessing via a switching system, the voice service system to easily discriminate and determine connected calls, and rapidly respond to the calls by an INVITE message as an SIP message attempting to access the voice service system including an INFO message which is a message regarding call information.

It is still another object of the present invention to provide, when a user accesses a voice service system over a network directly from a terminal, or a user accesses via an SIP server, or if a user accesses via a switching system, the VoIP-UMS to easily discriminate connected calls and rapidly respond to the calls through an SIP message attempting to access the VoIP-UMS containing call information.

It is another object of the present invention to provide a system and method providing VoIP-UMS utilization that has an efficient performance, easy to implement and cost effective.

To achieve these and other objectives, the present invention includes an SIP server for receiving a call request from an IP-phone, a separate VoIP-UMS prepared to perform a UMS function, and a private branch exchange for accessing the VoIP-UMS in response to the subscriber's request.

The present invention is characterized in that if a subscriber attempts to access the VoIP-UMS via a private branch exchange or if a subscriber attempts to access via an IP-phone directly, the VoIP-UMS can discriminate connected calls easily and respond to the calls rapidly because a transferred SIP message includes call information.

The present invention also provides a technique of accessing a voice service system over a network, including: upon accessing the voice service system, sending an initial call message, the initial call message containing an INFO message that represents call information; and providing, by the voice service system, a voice service in response to receiving the initial call message containing the INFO message. The initial call message is an INVITE message by a Session Initiation Protocol (SIP). Providing the voice service includes: providing, by the voice service system, a guide announcement to a user in response to the initial call message; and accessing, by the user, a voice mailbox according to the guide announcement. The voice mailbox is any one of a user's voice mailbox and a called party's voice mailbox depending on the INFO message contained in the initial call message.

The present invention also includes a technique of accessing a voice service system where a subscriber connects to a network via a switching system, including: connecting to the switching system by the subscriber; upon accessing the voice service system, sending an initial call message by the switching system, the initial call message containing an INFO message that represents call information; and providing, by the voice service system, a voice service in response to receiving the is initial call message containing the INFO message. The initial call message is an INVITE message by a Session Initiation Protocol (SIP). Providing the voice service includes: providing, by the voice service system, a guide announcement to a user in response to the initial call message; and connecting, by the user, to a voice mailbox according to the guide announcement. The voice mailbox is any one of a user's voice mailbox and a called party's voice mailbox depending on the INFO message contained in the initial call message.

The present invention is also characterized by a method of accessing a voice service system where a user connects to a network via a terminal, including: upon accessing the voice service system via the terminal, sending an initial call message by the user, the initial call message containing an INFO message that represents call information; and providing, by the voice service system, a voice service in response to receiving the initial call message containing the INFO message. The initial call message is an INVITE message by a Session Initiation Protocol (SIP). The terminal accesses the voice service system via a server connected to the terminal. Providing the voice service includes: providing, by the voice service system, a guide announcement to the user in response to the initial call message; and connecting, by the user, to a voice mailbox according to the guide announcement. The voice mailbox is any one of a user's voice mailbox and a called party's voice mailbox depending on the INFO message contained in the initial call message.

The present invention also provides a voice service system for providing a voice service over a network, including: a switching system having a Session Initiation Protocol module receiving an initial call message from a subscriber, the initial call message containing an INFO message that represents call information; and a voice service device having a Session Initiation Protocol module providing the voice service in response to receiving the initial call message transmitted from the switching system. The initial call message is an INVITE message by a Session Initiation Protocol (SIP). The voice service is such that the voice service system provides a guide announcement to a user in response to the initial call message, and the user connects to the voice mailbox and receives the provided voice service according to the guide announcement. The voice mailbox is any one of a user's voice mailbox and a called party's voice mailbox depending on the INFO message contained in the initial call message.

The present invention is also characterized by voice service system for providing a voice service over a network, including: a receiver for receiving an initial call message from a terminal when a subscriber accesses the voice service system, the initial call message containing an INFO message that represents call information; and a controller having a Session Initiation Protocol module included therein, the Session Initiation Protocol module providing the voice service in response to receiving the initial call message at the receiver. The initial call message is an INVITE message by a Session Initiation Protocol (SIP). The terminal accesses the voice service system via a server connected to the terminal. The voice service is such that the voice service system provides a guide announcement to a user in response to the initial call message, and the user connects to the voice mailbox and receives the provided voice service according to the guide announcement. The voice mailbox is any one of a user's voice mailbox and a called party's voice mailbox depending on the INFO message contained in the initial call message.

The present invention can also be realized by a computer-readable medium having computer-executable instructions for performing the above other techniques of the present invention.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE INVENTION

Hereinafter, preferred embodiments of the present invention will be described with reference to the accompanying drawings.

If it is decided that in describing the present invention below, detail description on related known functions or configurations makes the gist of the present invention to be unclear unnecessarily, such a detailed description will be omitted. Terms described below are terms defined in view of their functions in the present invention. The definitions maybe varied according to user's intention and practice and should be determined based on general contents of this disclosure.

Figure 1:
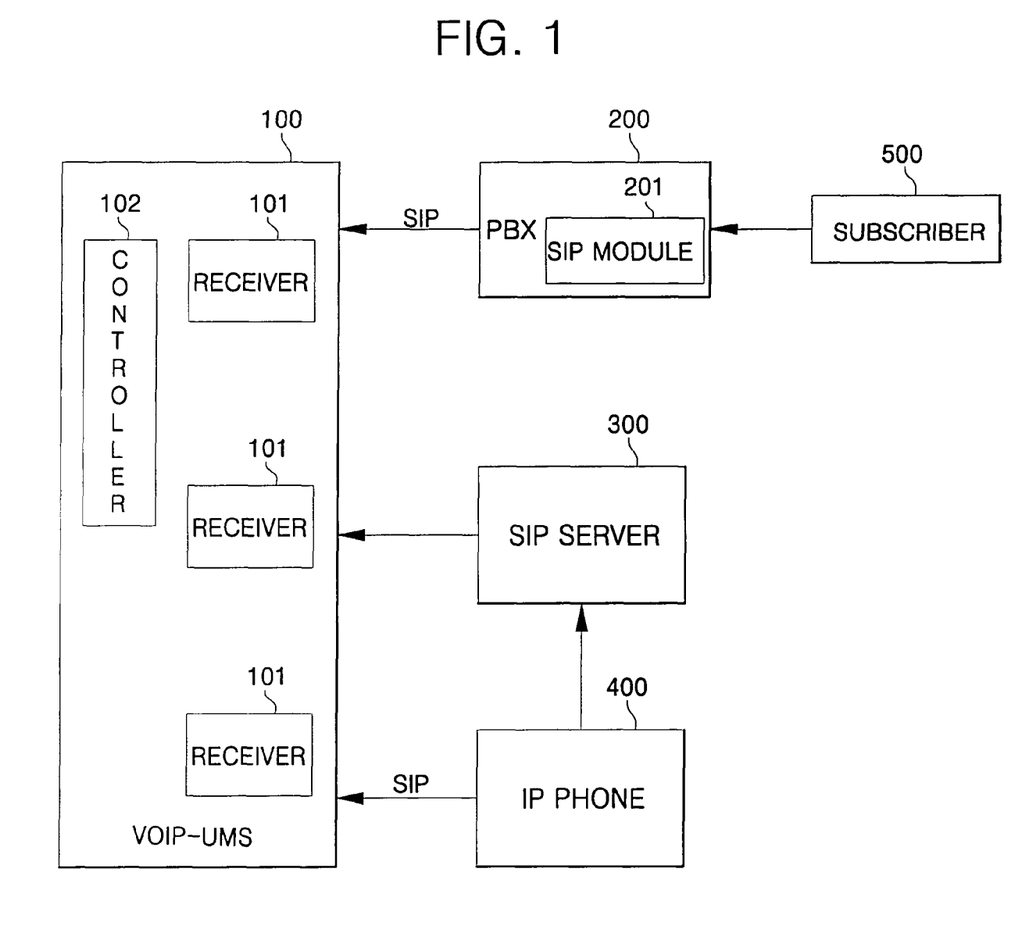
FIG. 1 is a diagram illustrating a VoIP-UMS according to the present invention.

FIG. 1 is a diagram illustrating a VoIP-UMS according to the present invention. As shown, the present invention includes a separate VoIP-UMS 100 prepared for performing a UMS function, a private branch exchange 200 accessing the VoIP-UMS according to a subscriber's request, and an SIP server 300 receiving a call request from an IP-phone (Internet protocol-phone) 400.

As previously described, the VoIP-UMS 100 is a system capable of accommodating, integrated-managing and operating all media used for existing IP (Internet protocol) communications using advanced technology based on existing VMS technology, E-mail, or the like. It is a system having many advantages in view of capacity extension, an accessing method, and cost compared to the conventional system.

The VoIP-UMS 100 includes a receiver 101 for receiving an initial call message according to an SIP from a terminal, and a controller 102 having an SIP module that provides a voice service in response to receiving the initial call message from the receiver.

Further, the private branch exchange, namely, the PBX 200 is a branch exchange that provides telephone services and various communication services. It performs a VoIP service in response to a subscriber's request to allow for accessing the VoIP-UMS 100. The PBX 200 has an SIP module 201 included therein, which receives the initial call message according to the SIP from the subscriber 500.

The SIP server 300 refers to a system that manages SIP terminals, and may be configured in various forms. Here, a network server, a registrar server, a location server, and the like belong to the SIP server.

The network server controls the SIP network and plays a role similar to a gatekeeper in H.323 (A standard approved by the International Telecommunication Union (ITU) that defines how audiovisual conferencing data is transmitted across networks). The network server includes a proxy server for processing an entire system and a redirect server for assuring the mobility of users.

The registrar server is a component that is necessary for an SIP user terminal to register as a part of the SIP network. The location server is a component for confirming an address in the SIP network and then retrieving a location corresponding to the confirmed address. Hereinafter, detail connection relations between the servers according to an SIP will be omitted while describing the present invention.

The IP-phone 400 is a telephone capable of transmitting and receiving voice data using IP, wherein protocols such as SIP, H.323 or the like are used.

As shown in FIG. 1, the present invention includes both VoIP-UMS 100 access by a subscriber via the PBX 200 and VoIP-UMS 100 access by the IP-phone 400.

In the earlier art, utilized is a manner of first sending an invite message and subsequently call information, namely, an INFO message representing information on call type when the VoIP-UMS 100 is accessed using an SIP.

Accordingly, after receiving the invite message from either the PBX 200 or the IP-phone 400, the VoIP-UMS 100 waited an INFO message regarding call type information indicating whether the call type is "direct" in which a caller party accesses his or her mailbox or "forward" in which a called part accesses his or her mailbox, and then transmitted a voice message.

As a result, there is a pending problem with the earlier art that time providing a voice message service is delayed since the voice message service cannot be provided until the INFO message is arrived at the VoIP-UMS.

In the present invention, to solve the problem that a voice message service is delayed until the INFO message arrives at the VoIP-UMS, a transferred invite message is combined to an INFO message. That is, in the present invention, a call type is inserted into a display name portion of a normal invite message by an SIP so that the invite message and the INFO message are combined. At this time, an example of the invite message and the INFO message will be described below.

Meanwhile, in the present invention, the private branch exchange 200 has an SIP module 201 included therein to allow an SIP to be performed, as described previously.

Hereinafter, a method of accessing the VoIP-UMS (100) in accordance with the present invention will be described in connection with access paths.

Figure 2:
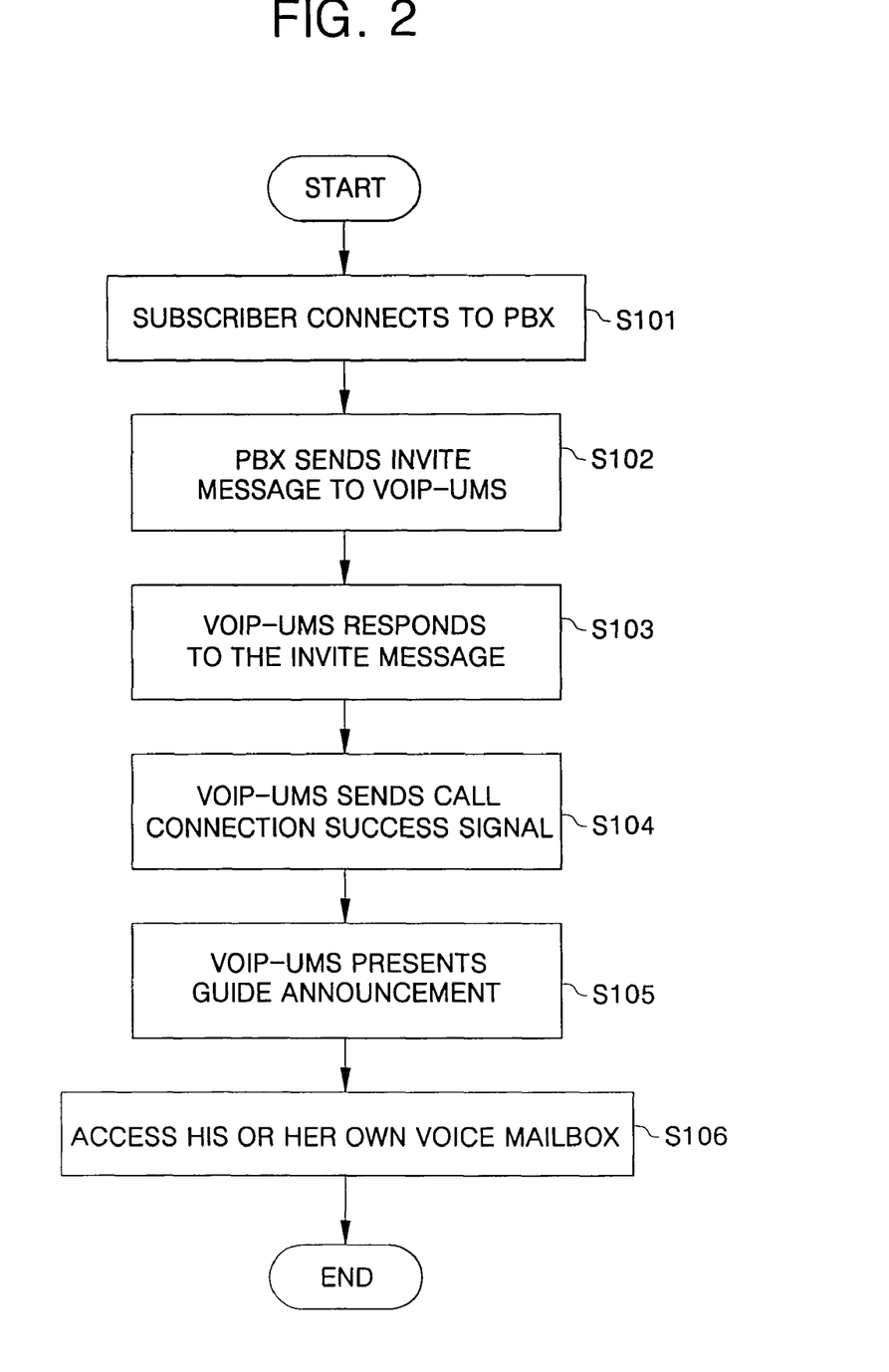
FIG. 2 is a flow diagram illustrating a method of accessing VoIP-UMS through a first path according to the present invention.

First, a method of accessing the VoIP-UMS 100 will be discussed in connection with a first path that is the case where a subscriber 500 listens to his or her voice mailbox message.

FIG. 2 is a flow diagram illustrating a method of accessing a VoIP-UMS through a first path according to the present invention. To access the subscriber's voice mailbox embedded in the VoIP-UMS 100, a subscriber 500 picks up his or her telephone and presses a predetermined number, such as 3681, for connecting to the voice mailbox to thereby connect to the PBX 200 (S101).

The PBX 200 sends an invite message to the VoIP-UMS 100 to connect to the voice mailbox (S102). At this time, the invite message contains information indicating that the subscriber directly connects to the voice mailbox.

As described above, in the earlier art, the PBX 200 sent the invite message and thereafter a separate INFO message to the VoIP-UMS 100 to notify that the subscriber directly connects to the voice mailbox. Accordingly, there is a problem with the earlier art that the VoIP-UMS 100 cannot provide a voice message service until it receives the INFO message, resulting in service time delay.

On the other hand, in the present invention, the invite message is sent to the VoIP-UMS 100, which includes an INFO message, namely, information notifying that the subscriber connects to the voice mailbox directly, as previously described. Accordingly, the VoIP-UMS 100 receives the delivered invite message and at the same time it can provide a voice message service.

That is, the VoIP-UMS 100 sends a trying message and a ringing message in response to receiving the invite message (S103). After retrieving the subscriber information, the VoIP-UMS 100 sends a 200 OK signal to notify that the call connection is successful (S104).

If the call path is established, the subscriber 500 will listen to an announcement that "enter your password" from the VoIP-UMS 100 (S105). The subscriber 500 enters the password to access and use his or her voice mailbox (S106).

Figure 3:
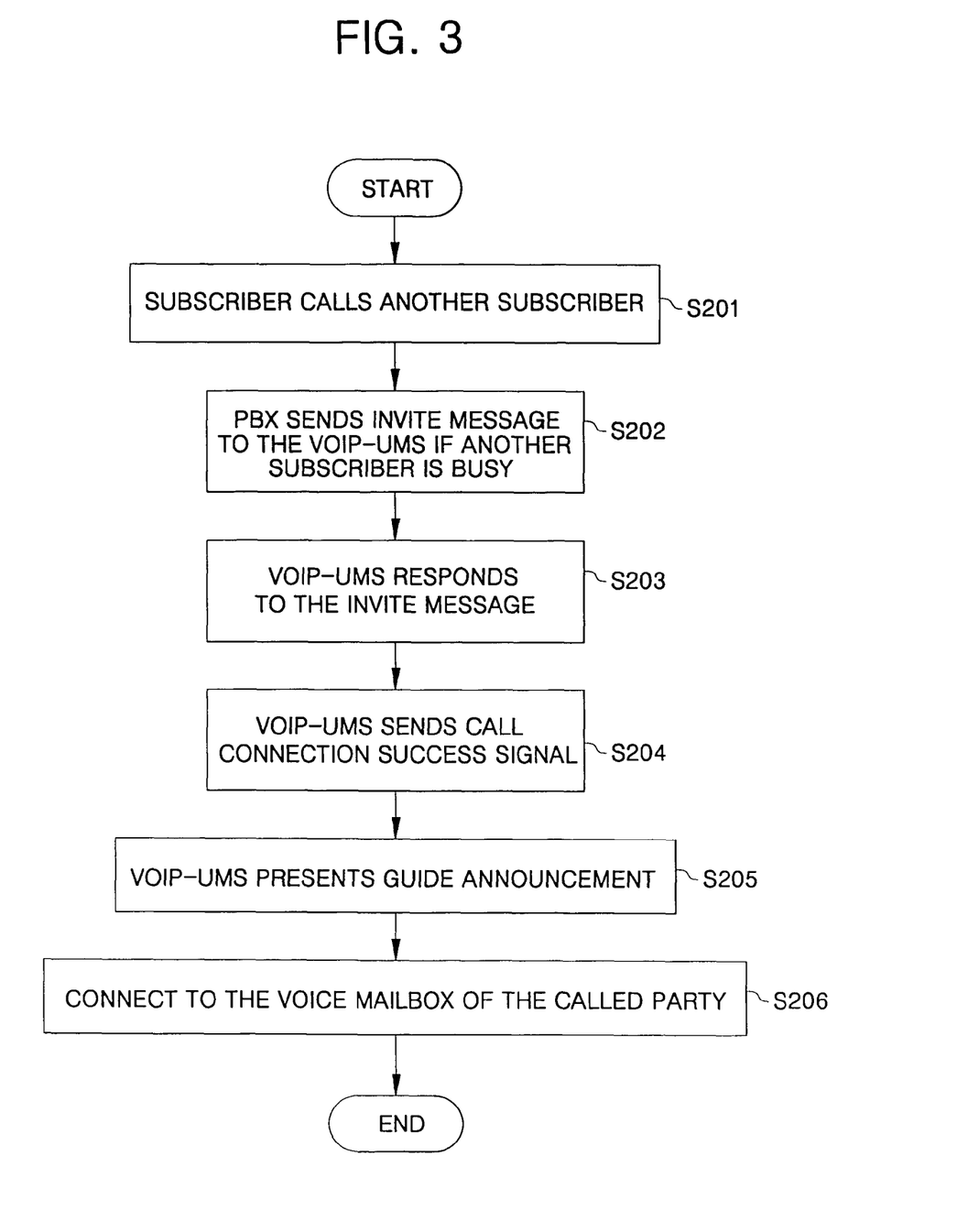
FIG. 3 is a flow diagram illustrating a method of accessing VoIP-UMS through a second path according to the present invention.

A second path corresponds to the case where the subscriber 500 attempts to talk with another subscriber but this subscriber is busy.

FIG. 3 is a flow diagram illustrating a method of accessing VoIP-UMS through a second path according to the present invention. When a called party is busy, the subscriber 500 connects to another subscriber's voice mailbox. This is called Busy Forward.

First, as described above, the subscriber 500 calls another subscriber but this subscriber is busy (S201). At this time, the PBX 200 sends an invite message to the VoIP-UMS 100 to connect the subscriber 500 to the voice mailbox of another subscriber (S202). At this time, the invite message is sent with INFO message information indicating that the call is attempted to another subscriber but is failed because another subscriber is busy. The VoIP-UMS 100 sends the trying message and the ringing message in response to receiving the invite message (S203).

The VoIP-UMS 100 sends a 200 OK message as a signal notifying that the call connection is successful after the VoIP-UMS 100 retrieves another subscriber information (S204). If a call path is established, the subscriber 500 will listen to an announcement indicating that "Now busy, leave your message in the voice mailbox" from the VoIP-UMS 100 (S205).

If the subscriber leaves his or her voice message and hangs up, the voice message will be held in the voice mailbox of another subscriber. If another subscriber desires to listen to the voice message recorded in the voice mailbox, the subscriber will follow the first path (S206).

Figure 4:
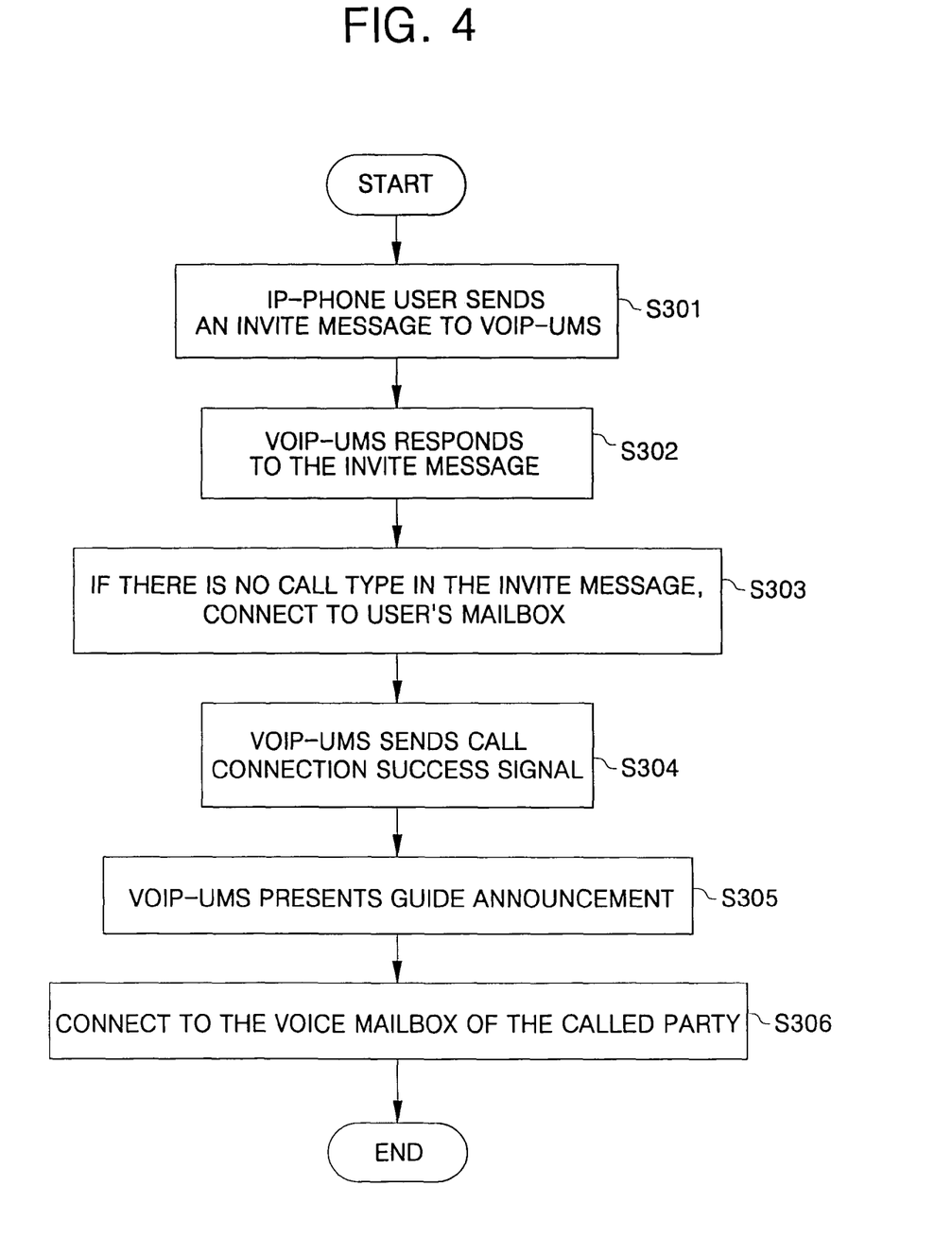
FIG. 4 is a flow diagram illustrating a method of accessing VoIP-UMS through a third path according to the present invention.

The third path is for the IP-phone 400 user to directly connect to the voice mailbox without passing through the PBX 200.

FIG. 4 is a flow diagram illustrating a method of accessing VoIP-UMS through a third path according to the present invention. The IP-phone 400 user first sends an invite message to the VoIP-UMS (S301). At this time, the IP-phone follows a general SIP, wherein the sent invite message does not contain call information.

The VoIP-UMS 100 sends a trying message and a ringing message in response to receiving the invite message (S302). If there is no call information in the invite message, the VoIP-UMS 100 regards the request as direct, namely, a direct connection to the mailbox and proceeds to service (S303).

The VoIP-UMS 100 retrieves information on the IP-phone 400 and then sends a 200 OK signal to notify that the call connection is successful (S304).

If the call path is established, the IP-phone 400 user will listen to an announcement of "Enter your password," and is serviced with the voice mailbox (S305 and S306).

Figure 5:
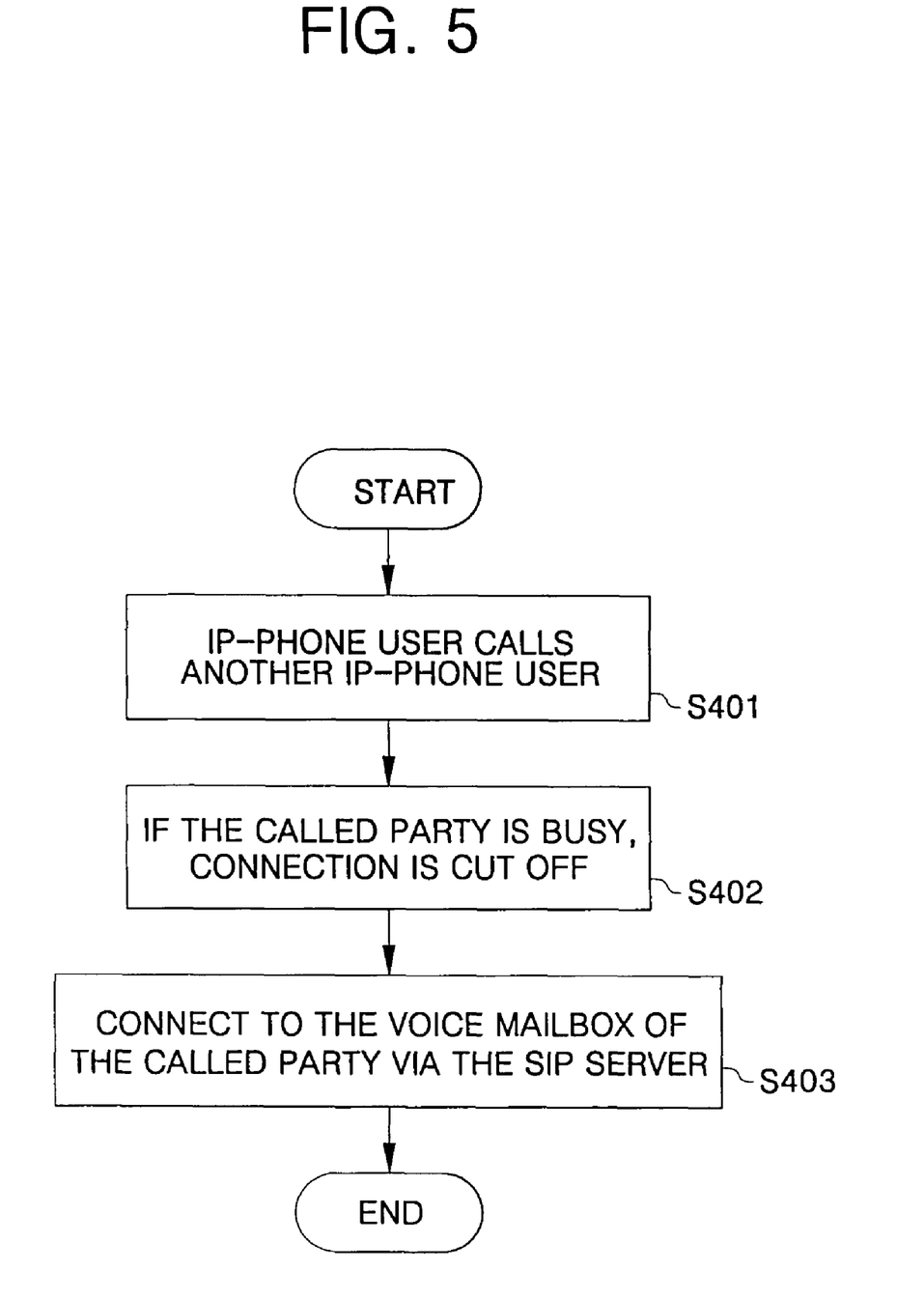
FIG. 5 is a flow diagram illustrating a method of accessing VoIP-UMS through a fourth path according to the present invention.

The fourth path is for the IP-phone 400 user to make a call with another IP-phone user.

FIG. 5 is a flow diagram illustrating a method of accessing VoIP-UMS through a fourth path according to the present invention. In the case where an IP-phone 400 user calls another IP-phone user directly (S401), if the called party is busy, the IP-phone 400 user receives a busy response and the telephone connection is cut off (S402).

At this time, the reason why the IP-Phone 400 is not connected to the voice mailbox of another IP-phone user is that the IP-phone has no function of forwarding a call. If the IP-phone 400 user desires to connect to the voice mailbox of another IP-phone user, the IP-phone should connect to the voice mailbox via the SIP server (S403).

Figure 6:
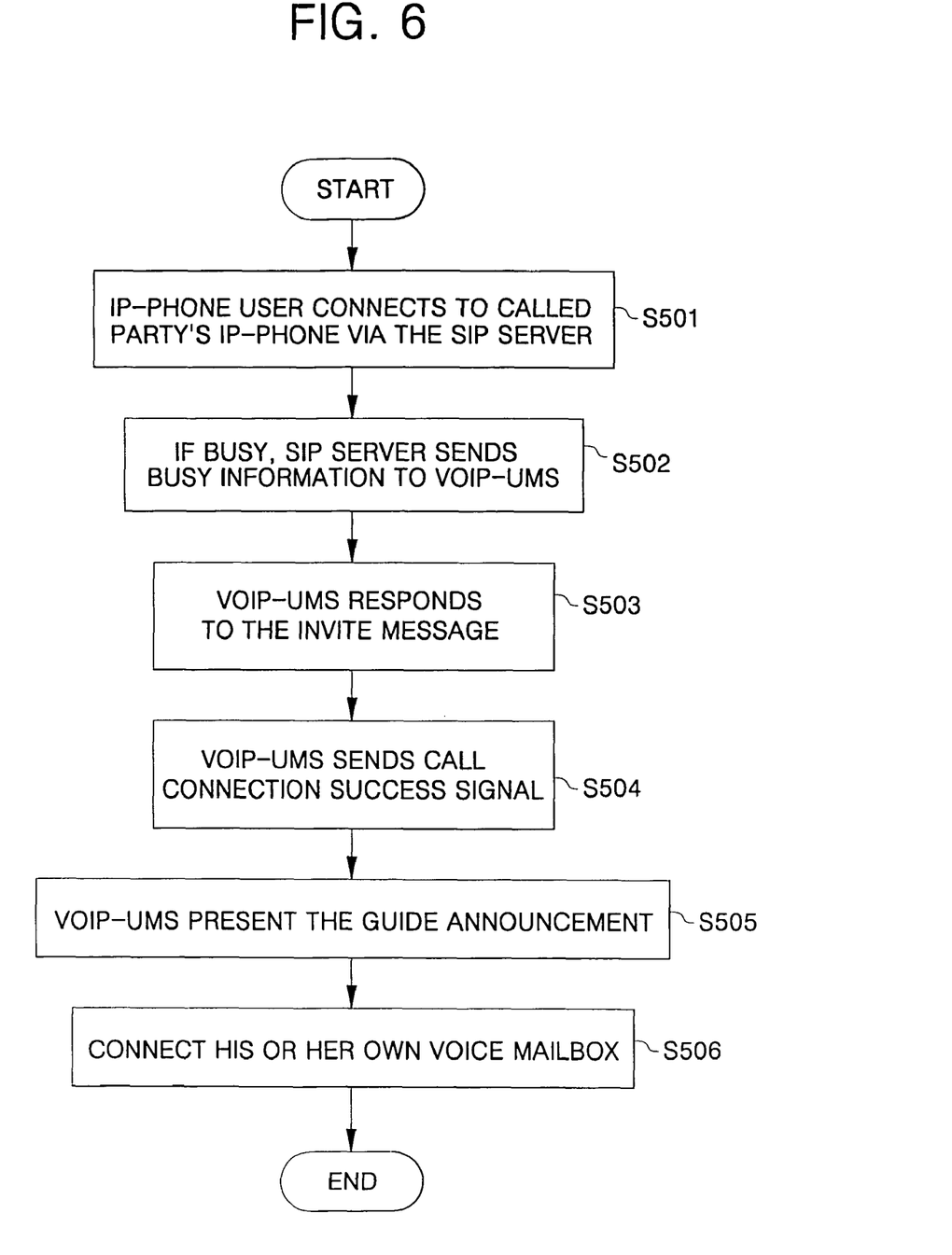
FIG. 6 is a flow diagram illustrating a method of accessing VoIP-UMS through a fifth path according to the present invention.

The fifth path is for the IP-phone 400 to call another IP-phone user via the SIP server 300.

FIG. 6 is a flow diagram illustrating a method of accessing VoIP-UMS through a fifth path according to the present invention. In the case where the IP-phone 400 user connects to another IP-phone user via the SIP server 300 (S501), the SIP server 300 performs Busy Forward with busy information, namely, call information to the VoIP-UMS 100 when another IP-phone user is busy.

The VoIP-UMS 100 receives an invite message. At this time, VoIP-UMS 100 can obtain information called Busy Forward from the call information contained in the invite message (S502). The VoIP-UMS 100 sends a trying message and a ringing message in response to receiving the invite message (S503).

The VoIP-UMS 100 is connected to the voice mailbox of another IP-phone user and sends a 200 OK signal to indicate that the call connection is successful (S504).

If the call path is established, the IP-phone 400 user will listen to an announcement of "Now busy, leave your message" from the VoIP-UMS 100. The IP-phone 400 user leaves a message in the voice mailbox of another IP-phone user according to the guide announcement (S505). At this time, another IP-phone user will confirm the voice message in the mailbox using the third path.

In the present invention, as previously described, accessing the VoIP-UMS 100 through various paths following the SIP is possible, wherein the invite message includes call information, allowing a service to be provided by the voice mailbox connection only with the arrival of the invite message.

The following is an example of an invite message in accordance with the present invention. Here, the SME_0001 corresponds to an INFO message that represents call information according to the present invention, and this message may be modified according to situations based on Table 1 described below.

INVITE sip:3691@168.219.149.164:5070 SIP/2.0
From: SME_0001<sip:201@168.219.149.169:5070>
To: 201<sip:3691@168.219.149.164:5060>
Call-ID: 1177c08-a8 db95a9-13ce-6b9b-1a45750-5f5a
CSeq: 1 INVITE
Max-Forwards: 69
Contact: <sip:201@168.219.149.169:5070>
Content-Type: application/sdp
Content-Length: 123
v=0
o=-0 0 IN IP4 168.219.149.169
s=SAMSUNG SIP gateway
c=IN IP4 168.219.149.190
t=00
m=audio 30000 RTP/AVP 18 4 8

TABLE 1

| Message type | ID | Description |
| --- | --- | --- |
| UMS_CTYPE_DII | 0x01 | Direct intercom call |
| UMS_CTYPE_DIL | 0x02 | Direct incoming call |
| UMS_CTYPE_DVAC | 0x03 | Vacant call from trunk |
| UMS_CTYPE_FWDA | 0x04 | Forward all |
| UMS_CTYPE_FWDB | 0x05 | Forward busy |
| UMS_CTYPE_FWDN | 0x06 | Forward no answer |
| UMS_CTYPE_FWDD | 0x07 | Forward do not disturb |
| UMS_CTYPE_MSGL | 0x08 | Message listen |
| UMS_CTYPE_RCLN | 0x09 | Normal recall |
| UMS_CTYPE_RCLA | 0x0A | Invalid recall |
| UMS_CTYPE_TRSF | 0x0B | Transfer |
| UMS_CTYPE_OVF | 0x0C | Overflow |
| UMS_CTYPE_GRT | 0x0D | Greeting change key |
| UMS_CTYPE_OPT | 0x0E | Option change key |
| UMS_CTYPE_DIVR | 0x0F | Direct IVR (not used) |
| UMS_CTYPE_SOUT | 0x10 | Outgoing setting (not used) |
| UMS_CTYPE_SVAC | 0x11 | Vacant setting (not used) |
| UMS_CTYPE_AME | 0x12 | Answering machine emulation |
| UMS_CTYPE_ACD | 0x13 | Auto. Call dist. (not used) |
| UMS_CTYPE_CRD | 0x14 | Call record |
| UMS_CTYPE_MEMO | 0x15 | Memo |
| UMS_CTYPE_MEMO_C | 0x16 | Memo CTI |
| UMS_CTYPE_DID | 0x17 | Direct inward dial |
| UMS_CTYPE_RCLP | 0x18 | Call over page recall |
| UMS_CTYPE_MSGV | 0x19 | Message view |
| UMS_CTYPE_ADMIN | 0x1A | System administration |
| UMS_CTYPE_BASE | 5000 | MOH prompt '0' |
| UMS_CTYPE_NONE | 0 | None, for logical completeness |

As denoted in Table 1, the INFO message within the invite message has a different meaning as the ID is changed.

For example, the SME_0004 is a message indicating Forward All, wherein all call connections are made with UMS. As another example, SME_00012 is a message that indicates answering machine emulation, wherein a connection is made in an AME mode.

Meanwhile, another example according to the present invention will be discussed in which the INFO message in the invite message is SME_0005. The SME_0005 is a message indicating Forward Busy, wherein a connection is made with UMS when a called party is busy.

At this time, the connection by UMS follows the second path as previously described, and is as shown in FIG. 3. That is, if the called party is busy, the subscriber 500 is connected to the voice mailbox of another subscriber. This is called Busy Forward.

First, as described above, the subscriber 500 calls another subscriber but this subscriber is busy (S201). At this time, the PBX 200 sends an invite message to the VoIP-UMS 100 in order to connect the subscriber 500 to the voice mailbox of another subscriber (S202). At this time, the invite message is sent with an INFO message that has information indicating that the subscriber attempted to make a call another subscriber but failed to make the call due to a busy state of another subscriber. An example of the INFO message containing the invite message will be described below.

Meanwhile, the VoIP-UMS 100 sends a trying message and a ringing message in response to receiving the invite message (S203). After retrieving information on another subscriber, the VoIP-UMS 100 sends a 200 OK signal to notify that a call connection is successful (S204). When the call path is established, the subscriber 500 will listen to an announcement that "Now busy, leave your message in the voice mailbox" from the VoIP-UMS 100 (S205).

If the subscriber leaves a voice message and hangs up, the voice message is left in the voice mailbox of another subscriber. If another subscriber desires to listen to the voice message left in his or her voice mailbox, another subscriber follows the first path.

The following is an example of an invite message indicating that the INFO message is SME__0005.

INVITE sip:3691@168.219.149.164:5070 SIP/2.0
From: SME__0005<sip:201@168.219.149.169:5070>
To: 201<sip:36911168.219.149.164:5060>
Call-ID: 1177c08-a8 db95a9-13ce-6b9b-1a45750-5f5a
CSeq: 1 INVITE
Max-Forwards: 69
Contact: <sip:201@168.219.149.169:5070>
Content-Type: application/sdp
Content-Length: 123
v=0
o=–0 0 IN IP4 168.219.149.169
s=SAMSUNG SIP gateway
c=IN IP4 168.219.149.190
t=00
m=audio 30000 RTP/AVP 18 4 8

Meanwhile, the configuration of the above-stated invite message will be described in brief. First, INVITE of the invite message corresponds to the SIP message and means that a calling party will participate in the SIP session. FROM is a portion corresponding to an SIP header and indicates a starting point of SIP transaction. TO is also a portion corresponding to the SIP header and indicates a destination of the SIP transaction.

Call-ID is a portion corresponding to the SIP header and indicates the Id (identification) of the SIP transaction. Contact is a portion corresponding to the SIP header and indicates a location of a starting point of the SIP session. Content-Type is a portion corresponding to the SIP header and indicates the type of SIP content. Content-Length is also a portion corresponding to the SIP header and indicates the length of the SIP content.

v=0 is a portion corresponding to an SIP body and indicates SIP version information. Others may be interpreted with reference to RFC (request for comments) 2327.

As previously described, the present invention is characterized by accessing the UMS with the invite message containing the access message information. Accordingly, the UMS according to the present invention can easily discriminate calls connected by a display name (e.g., SME__0005) of a FROM header making up the invite message, thereby providing a proper voice service.

Meanwhile, in the present invention, the voice service system and the private branch exchange include an SIP module to allow an SIP to be performed, as described above. Thus, because the private branch exchange according to the present invention supports an SIP message, a user can set his or her phone to BUSY or ALL FORWARD so that an incoming call when the user is busy or all incoming calls are connected with the UMS.

As a result, according to the present invention as described above, if a user accesses a voice service system over a network directly from a terminal, a user accesses via an SIP server, or a user accesses via a switching system, the voice service system can easily discriminate and determine connected calls, and rapidly respond to the calls because an INVITE message as an SIP message attempting to access the voice service system includes an INFO message which is a message regarding call information.

According to the present invention, if a user accesses a voice service system over a network directly from a terminal, or a user accesses via an SIP server, or if a user accesses via a switching system, the VoIP-UMS can easily discriminate connected calls and rapidly respond to the calls because an SIP message attempting to access the VoIP-UMS contains call information.

The present invention can be realized as computer-executable instructions in computer-readable media. The computer-readable media includes all possible kinds of media in which computer-readable data may be stored or written and the computer-readable data may include any type of data that can be read by a computer or a processing unit. The computer-readable media include for example and is not limited to, storage media, such as magnetic storage media (e.g., ROMs, floppy disks, hard disks, and the like), optical reading media (e.g., CD-ROMs (compact disc-read-only memories), DVDs (digital versatile discs), re-writable versions of the optical discs, and the like), hybrid magnetic optical disks, organic discs, system memories (read-only memories, random access memories), non-volatile memory such as flash memory or any other volatile or non-volatile memory, and other semiconductor devices, electronic devices, electromagnetic devices and infrared devices. The computer-readable data may be transmitted over communication paths through propagation of carrier waves (e.g., transmission via the Internet or another computers net). The transmission paths generally carry computer-readable instructions, data structures, program modules or other data in a modulated signal such as the carrier waves or other modes of signal transmission including any information delivery media. The computer-readable instructions, data structures, program modules or the other data may also be transmitted over wireless signals such as radio frequency, infrared waves and microwave carriers of information and data signals, and wired media such as a fixed wire network. Also, the computer-readable media can store computer-readable codes that are distributed among computers connected via a network. The computer readable medium also includes cooperating or interconnected computer readable media that are in loaded in the processing system or are distributed among multiple processing systems that may be local or remote to the processing system. The present invention can include the computer-readable medium having stored thereon a data structure that includes a plurality of fields containing data representing the techniques of the present invention.

Although the technical spirit of the present invention has been described in conjunction with the accompanying drawings, it illustrates the preferred embodiment of the present invention and does not limit the present invention. Further, it will be apparent to those skilled in the art that various modifications and variations may be made to the present invention without departing from the technical spirit and scope of the present invention.

What is claimed is:

1. A method of accessing a voice service system over a network, the method comprising:
   upon accessing the voice service system, sending an INVITE message by a Session Initiation Protocol (SIP), the INVITE message comprising call information which represents a call type for a current call, the call type indicating an incoming cause of the access to the voice service system;
   receiving the INVITE message for the current call; and
   providing, by the voice service system, the voice service according to the call type.

2. The method according to claim 1, wherein providing the voice service includes:
   providing, by the voice service system, a guide announcement to a user according to the call type; and
   accessing, by the user, a voice mailbox according to the guide announcement.

3. The method according to claim 2, wherein the voice mailbox is any one of a user's voice mailbox and a called party's voice mailbox depending on the call type contained in the INVITE message.

4. The method according to claim 1, wherein the cause represents at least one of direct call, forward call, message listen, recall, setting, memo, and call record.

5. A method of accessing a voice service system where a subscriber connects to a network via a switching system, the method comprising:
   connecting to the switching system by the subscriber;
   upon accessing the voice service system, sending an initial call message by the switching system, the initial call message containing an INFO message that represents call information which represents a call type for a currently attempted call, the call type indicating an incoming cause of the access to the voice service system; and
   providing, for the currently attempted call, by the voice service system, the voice service according to the call type contained in the initial call message containing the INFO message.

6. The method according to claim 5, wherein providing the voice service includes:
   providing, by the voice service system, a guide announcement to a user according to the call type; and
   connecting, by the user, to a voice mailbox according to the guide announcement.

7. The method according to claim 6, wherein the voice mailbox is any one of a user's voice mailbox and a called party's voice mailbox depending on the call type contained in the initial call message.

8. The method according to claim 5, wherein the cause represents at least one of direct call, forward call, message listen, recall, setting, memo, and call record.

9. A method of accessing a voice service system, the method comprising:
   upon accessing the voice service system by a terminal, sending an INVITE message by a Session Initiation Protocol (SIP), the INVITE message comprising call information which represents a call type for a current call, the call type indicating an incoming cause of the access to the voice service system; and
   receiving, from the voice service system, the voice service according to the call type contained in the INVITE message.

10. The method according to claim 9, wherein receiving the voice service includes:
    receiving, from the voice service system, a guide announcement according to the call type; and
    connecting to a voice mailbox according to the guide announcement.

11. The method according to claim 10, wherein the voice mailbox is any one of a user's voice mailbox and a called party's voice mailbox depending on the call type contained in the INVITE message.

12. The method according to claim 9, wherein the cause represents at least one of direct call, forward call, message listen, recall, setting, memo, and call record.

13. A voice service system for providing a voice service over a network, the system comprising:
    a switching system having a Session Initiation Protocol module receiving an initial call message from a subscriber, the initial call message comprising an INFO message that represents call information which represents a call type for a currently attempted call, the call type indicating an incoming cause of the access to the voice service system; and
    a voice service device having a Session Initiation Protocol module providing, for the currently attempted call, the voice service according to the call type contained in the initial call message transmitted from the switching system.

14. The system according to claim 13, wherein the initial call message is an INVITE message by a Session Initiation Protocol.

15. The system according to claim 13, wherein the voice service accommodating the voice service system providing a guide announcement to a user according to the call type, and the user connects to the voice mailbox and receives the provided voice service according to the guide announcement.

16. The system according to claim 15, wherein the voice mailbox is any one of a user's voice mailbox and a called party's voice mailbox depending on the call type contained in the initial call message.

17. The system according to claim 13, wherein the cause represents at least one of direct call, forward call, message listen, recall, setting, memo, and call record.

18. A voice service system for providing a voice service over a network, the system comprising:
    a receiver for receiving an INVITE message from a terminal accessing the voice service system, the INVITE message comprising call information which represents a call type for a current call, the call type indicating an incoming cause of the access to the voice service system; and
    a controller having a Session Initiation Protocol module included therein, the Session Initiation Protocol module providing, for the current call, the voice service according to the call type.

19. The system according to claim 18, wherein the voice service is such that the voice service system provides a guide announcement to a user in response to the call type, and the user connects to the voice mailbox and receives the provided voice service according to the guide announcement.

20. The system according to claim 19, wherein the voice mailbox is any one of a user's voice mailbox and a called party's voice mailbox depending on the call type contained in the INVITE message.

21. The system according to claim 18, wherein the cause represents at least one of direct call, forward call, message listen, recall, setting, memo, and call record.

22. A non-transitory computer-readable medium having computer-executable instructions for performing a method of accessing a voice service system over a network, comprising:
 a stage, upon accessing the voice service system, sending an initial call message, the initial call message including a first message representing call information with which the voice service system provides a currently attempted call with the voice service in accordance, and the call information representing a call type for the currently attempted call, the call type indicating an incoming cause of the access to the voice service system.

23. The non-transitory computer-readable medium according to claim 22, wherein the cause represents at least one of direct call, forward call, message listen, recall, setting, memo, and call record.

24. A non-transitory computer-readable medium having stored thereon a data structure, the computer-readable medium comprising:
 a first storage stage including a first field containing data representing connecting to the switching system by a subscriber;
 a second storage stage including a second field containing data representing upon accessing the voice service system, sending an initial call message by the switching system, the initial call message including a first message representing call information which represents a call type for a currently attempted call, the call type indicating an incoming cause of the access to the voice service system; and
 a third storage stage including a third field containing data representing providing, for the currently attempted call, by the voice service system, the voice service according to the call type contained in the initial call message including the first message.

25. The non-transitory computer-readable medium according to claim 24, wherein the cause represents at least one of direct call, forward call, message listen, recall, setting, memo, and call record.

* * * * *